W. V. TURNER.
RETAINING VALVE DEVICE.
APPLICATION FILED DEC. 13, 1916.
1,276,999.
Patented Aug. 27, 1918.
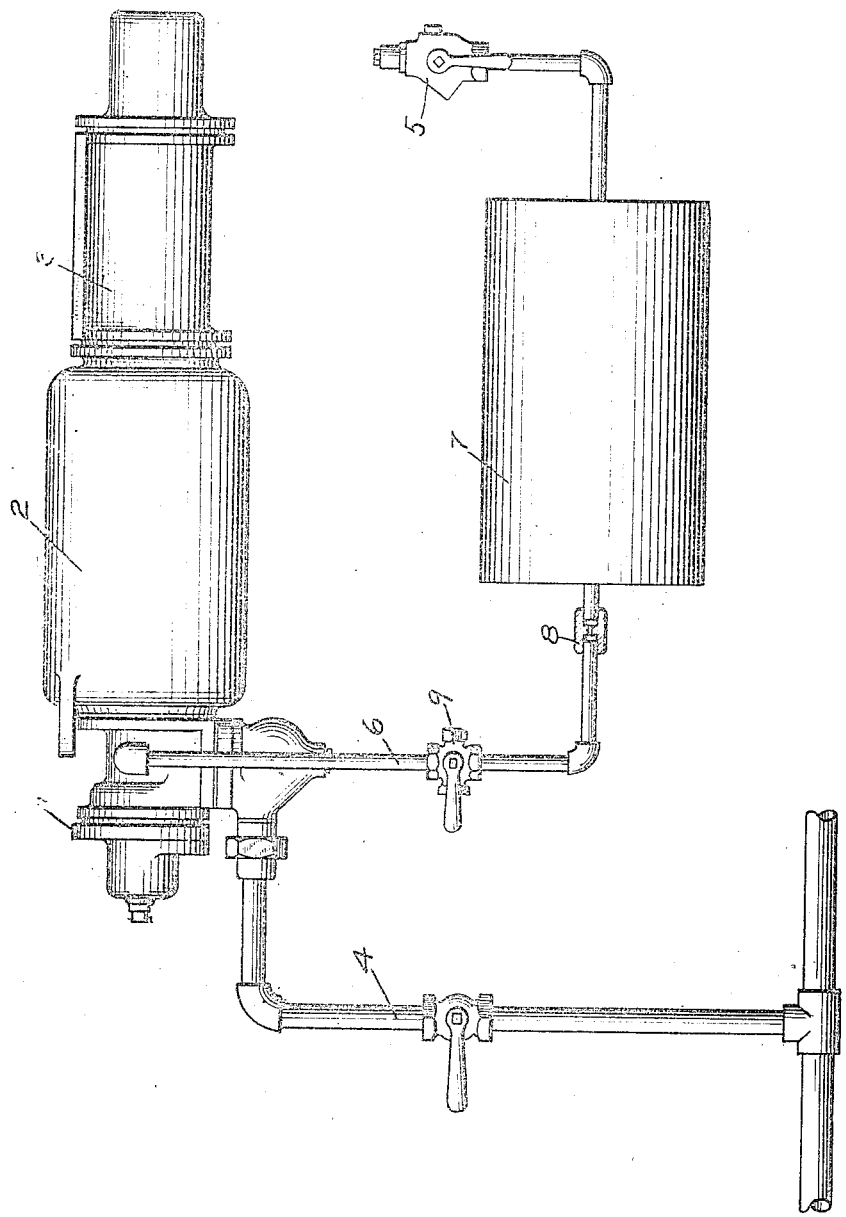
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

RETAINING-VALVE DEVICE.

1,276,999.

Specification of Letters Patent.

Patented Aug. 27, 1918.

Application filed December 13, 1916. Serial No. 136,609.

*To all whom it may concern:*

Be it known that I, WALTER V. TURNER, a citizen of the United States, residing at Wilkinsburg, in the county of Allegheny and State of Pennsylvania, have invented new and useful Improvements in Retaining-Valve Devices, of which the following is a specification.

This invention relates to fluid pressure brakes, and more particularly to means for retaining fluid under pressure in the brake cylinder.

It has heretofore been proposed to employ a retaining valve device adapted to be connected to the brake cylinder in release position of the triple valve device and operating to restrict the exhaust from the brake cylinder and to cut off the exhaust entirely when the brake cylinder pressure has been reduced to a predetermined degree, the object being to hold the brakes applied while the auxiliary reservoirs are being recharged, so that control of the train will not be lost, particularly when operating on grades.

The time of recharge of the auxiliary reservoirs, however, particularly on a long train, may be such that the brake cylinder pressure may be lost by leakage past the brake cylinder piston before the system has been sufficiently recharged to permit of a second application of the brakes.

The principal object of my invention is to provide means for overcoming the above difficulty.

In the accompanying drawing, the single figure is a diagrammatic view of a car air brake equipment, showing my invention applied thereto.

The equipment may comprise a triple valve device 1, an auxiliary reservoir 2, a brake cylinder 3, and a brake pipe 4, corresponding with the usual automatic fluid pressure brake equipment.

A retaining valve device 5 is connected by a pipe 6 with the exhaust port of the triple valve device 1 and interposed in the pipe 6 is a reservoir 7. In the pipe 6 between the reservoir 7 and the triple valve device is a choke plug 8 and a three way cock 9 having one position for connecting the triple valve exhaust to the atmosphere and another position for connecting the exhaust to the retaining valve device 5.

In operation, upon releasing the brakes after the brakes have been applied in the usual manner, if the cock 9 is turned to the position for connecting the triple valve exhaust to the retaining valve device 5, fluid from the brake cylinder flows slowly through the choke 8 into the reservoir 7.

When the pressure in the reservoir 7 by flow from the brake cylinder increases to the degree at which the retaining valve device 5 is adjusted, fluid is exhausted at the retaining valve device so that the pressure in the reservoir does not rise above the setting of the retaining valve.

If there is leakage past the brake cylinder piston, the consequent reduction in brake cylinder pressure causes a back flow of fluid from the reservoir 7 through the choke 8 to the brake cylinder, so that the pressure in the brake cylinder will be maintained for a longer period and thus insure that the brakes will be held applied until the brake system has been sufficiently recharged to permit of another application of the brakes.

The choke 8 prevents the too rapid reduction of brake cylinder pressure by flow to the reservoir 7 and is preferably of such size as to permit substantially the same rate of flow from the brake cylinder as would be the case were the flow directly through the usual retaining valve device.

Having now described my invention, what I claim as new and desire to secure by Letters Patent is:

1. In a fluid pressure brake, the combination with a brake cylinder and a retaining valve device, of a fixed volume reservoir interposed between the brake cylinder and said retaining valve device.

2. In a fluid pressure brake, the combination with a brake cylinder, triple valve device and a retaining valve device connected to the triple valve exhaust port, of a reservoir having a constant volume interposed between the triple valve device and the retaining valve device.

3. In a fluid pressure brake, the combination with a brake cylinder, triple valve device and a retaining valve device connected by a pipe to the triple valve exhaust port, of a reservoir of constant volume interposed in said pipe.

4. In a fluid pressure brake, the combination with a brake cylinder, triple valve device and a retaining valve device connected to the triple valve exhaust port, of a reservoir interposed between the triple valve device and the retaining valve device and means for restricting communication from the triple valve device to the reservoir.

In testimony whereof I hereunto set my hand.

WALTER V. TURNER.